United States Patent [19]

Schick

[11] 4,431,447
[45] Feb. 14, 1984

[54] CORROSION RESISTANT WELD OVERLAY CLADDING ALLOY AND WELD DEPOSIT

[75] Inventor: Wilbur R. Schick, San Antonio, Tex.

[73] Assignee: Southwest Research Institute, San Antonio, Tex.

[21] Appl. No.: 372,320

[22] Filed: Apr. 27, 1982

[51] Int. Cl.³ .............................................. C22C 38/12
[52] U.S. Cl. .............................. 75/128 W; 75/128 R; 219/146.1
[58] Field of Search ............ 75/128 C, 128 W, 126 C, 75/128 R; 228/263.14, 263.15; 219/146.23, 146.1

[56] References Cited

U.S. PATENT DOCUMENTS

| | | | |
|---|---|---|---|
| 2,306,662 | 12/1942 | Krivobok | 75/128 W |
| 2,544,336 | 3/1951 | Linnert | 75/128 W |
| 2,789,049 | 4/1957 | DeLong | 75/126 C |
| 3,837,846 | 9/1974 | Becker et al. | 75/128 W |
| 4,049,431 | 9/1977 | Hagel | 75/126 C |
| 4,078,920 | 3/1978 | Liljas et al. | 75/128 W |

*Primary Examiner*—L. Dewayne Rutledge
*Assistant Examiner*—Debbie Yee
*Attorney, Agent, or Firm*—Sigalos & Levine

[57] ABSTRACT

A corrosion resistant stainless steel welding alloy for overlay cladding containing sufficient molybdenum to give a weld deposit containing from about 4 to 6 weight percent of molybdenum and the resultant weld deposit.

4 Claims, No Drawings

CORROSION RESISTANT WELD OVERLAY CLADDING ALLOY AND WELD DEPOSIT

BACKGROUND OF THE INVENTION

The present invention relates to corrosion resistant weld overlay cladding alloys which can be used in high temperature, corrosive environments in order to prevent corrosion of stainless steels and particularly austenitic stainless steel equipment.

More particularly, the present invention is concerned with the prevention of corrosion in stainless steel components exposed to corrosive environments in chemical processing equipment and especially apparatus used in the manufacture of tall oils such as distillation towers. In carrying out such distillation, temperatures in the range of 400° to 500° F. are used and corrosive materials present in the tower include tall oil, oleic acid, sulfur compounds and traces of chlorides and other acidic and/or corrosive degradation materials. The original roll bond cladding is attached and in many cases had roughened surface giving the appearance of a sandpaper texture and in more advanced stages a uniform pitting. In some instances singular pits are located in the roll bond which actually penetrate the wall of the apparatus. It is theorized that these isolated pits are the result of imperfections in the roll bond clad and it is surmised that the pits might result from free iron imbedded in the clad during the building process. Thirdly, "washouts" in the alloy cladding occur in areas of the weld overlay. It is deemed that these washouts are caused by varying quality in the wire used in welding. A fourth defect is porosity of the weld in the alloy cladding which typically occurs between the weld beads. These corrosions effects necessitate frequent shutdown and repair of the apparatus which is not only costly but dangerous particularly in cases where the corrosion actually causes penetration through the apparatus wall.

Efforts to overcome such corrosion problem have included use of a variety of alloys, but these have not been successful. The result is either frequent shut-down and costly repair or, in some cases, extremely costly replacement of the corroded equipment.

SUMMARY OF THE INVENTION

The present invention overcomes the difficulties and provides unique corrosion resistant weld overlay cladding alloys and weld deposits successful in resisting corrosion in highly corrosive situations such as those involved in chemical processing applications.

Briefly stated, the present invention comprises corrosion resistant stainless steel welding alloys for overlay cladding containing sufficient molybdenum to give a weld deposit containing from about 4 to 6 weight percent of molybdenum; preferably an alloy containing from 5 to 7.5 weight percent of molybdenum, and to the resultant weld deposits containing from about 4 to 6 weight percent of molybdenum.

DETAILED DESCRIPTION

While the instant invention is suitable for increasing corrosion resistance of stainless steel used in chemical processing apparatus, it will be discussed in connection with corrosion resistance in processing apparatus and particularly distillation towers and associated vessels used in tall oil manufacture.

As previously noted, the tall oil itself and the various other acids and acidic degradation products along with sulfur compounds and chlorides are corrosive particularly with respect to the austenitic stainless steels that are utilized in the apparatus such as the distillation towers necessary for the manufacture of the tall oil.

Corrosion resistance is accomplished in the present invention by utilizing a cladding to resist such corrosion and a particular weld overlay cladding alloy. The essential and critical requirement of the present invention is that the alloy contain a specific amount of molybdenum and more particularly that the resultant stainless steel weld deposit contain from about 4 to 6 weight percent of molybdenum. It is important to recognize the distinction between the weld alloy and the weld deposit since it is well known that there is alloy dilution and losses for certain materials in welding. Such dilution effect is known for chromium and nickel and it has been determined in the instant application that molybdenum losses during welding also occur similar to chromium loss. Thus, the welding wire must contain an adequate percentage of molybdenum to take into account this dilution loss during welding and to be sure that the final weld deposit contain from about 4 to 6 weight percent of the molybdenum.

Most suitably the corrosion resistant weld deposit of the present invention consists essentially of, in weight percent:

Silicon: From 0.5 to 1%,
Manganese: From 1 to 2%,
Carbon: From 0.01 to 0.1%,
Nickel: From 10 to 15%,
Chromium: From 17 to 23%,
Molybdenum: From 4 to 6%, and
the balance iron and incidental and residual elements. The incidental impurities include materials such as phosphorous, sulfur and the like conventionally present as impurities and the residual elements include titanium, vanadium, cobalt, copper, columbium and tantalum.

In order to have levels of 4 to 6 weight percent molybdenum in the weld deposits it is necessary to have amounts larger than that present in the weld overlay cladding alloy. Most usually 6.75 weight percent plus or minus 0.5 weight percent.

It is also a feature of the present invention that the welding alloy not contain levels of molybdenum much above about 7.5% since this is found to have a detrimental effect. More specifically, it has been found that when high levels of molybdenum are present it can result in a large increase in the ferrite content of the cladding and possibly result in cracking. Thus, it is desired to keep the ferrite content at a level below about 15% and, preferably, below in the range of about 7 to 14 percent. Therefore, the instant invention requires not only higher levels of molybdenum in the alloy but also care that the level is not too high in order not to result in too high a percent of ferrite content, it being discovered that very high ferrite contents of the weld cladding are related to cracking.

It must also be pointed out that when discussing the content of materials in the weld deposit that the nature of the flux is also important. For example, it is possible to utilize weld alloys having lower levels of chromium and simply to provide for additional chromium content to the weld by using a suitable flux. It is also for this reason that the fluxing material used result in changes. It will be noted, for example, that the ranges of the various components in the alloy and in the weld deposit differ and this is due, as noted, to the dilution factor caused by the welding and in the pickup of certain amounts of elements during the welding from the flux. But it is essential, however, in every instance, and the essence and key of the present invention that the molybdenum content in the weld deposit be at a level of from about 4 to 6 weight percent.

A suitable weld overlay clad alloy, for use with commercially available fluxed such as Lincoln ST 100 chromium sustaining flux, consists essentially of, in weight percent:

Silicon: 0.0 to 0.6%,
Manganese: 0.05 to 2.0%,
Carbon: 0.01 to 0.1%,
Nickel: 10 to 15%,
Chromium: 17 to 23%,
Molybdenum: 5 to 7.5%, and the balance iron and individual impurities and residual elements.

In applying the weld, it is preferred to utilize any conventional two-wire welding process and more particularly to use submerged arc welding utilizing automatic welding equipment.

The invention will be further described in connection with the following example which is set forth for purposes of illustration only and not by way of limitation.

EXAMPLE

A distillation tower wall was clad. The area encompassed approximately 800 square feet. The welding process employed was the conventional dual wire technique with one-eighth and five-thirty-seconds inch diameter alloy wire having the following average composition and weight percent:

Carbon: 0.014%,
Manganese: 0.090%
Silicon: 0.27%,
Chromium: 19.64%,
Nickel: 13.75%,
Molybdenum: 6.58%,
Phosphorous: 0.005%,
Sulfur: 0.03%,
Titanium: 0.02%,
Vanadium: 0.02%,
Cobalt: 0.03%,
Copper: 0.06%,
Columbium: 0.43%,
Tantalum: 0.43%

The balance of the composition was iron and it had a Ferrite No. of 18.3. A Lincoln ST 100 type flux was used to provide an additive of chromium content to the weld.

The following parameters were used in the welding: 550–600 amperes for each dual wire head, 24–26 volts, and 55.4 inches permitted travel speed.

The actual welding currents, measured after the welding operation was finally adjusted, were 700 to 740 amperes as follows:

(a) Head, 290 amperes on the ⅛-inch and 410 amperes on the 5/32-inch diameter wire, and (b) Head, 330 amperes on the ⅛-inch and 410 amperes on the 5/32 -inch diameter wire.

Completion of the weld cladding of the walls was considered to be satisfactorily accomplished and to meet ASME Boiler and Pressure Vessel Code requirements.

Subsequent inspection after the tower had been back in operation for a period showed that there was no attack of the original cladding, there were no individual pits nor any washouts in the alloy cladding nor was any weld porosity found in the alloy cladding or any etching thereof.

While the invention has been described in connection with a preferred embodiment, it is not intended to limit the scope of the invention to the particular form set forth, but, on the contrary, it is intended to cover such alternatives, modifications, and equivalents as may be included in the spirit and scope of the invention as defined by the appended claims.

What is claimed is:

1. A corrosion resistant welding alloy for overlay cladding containing sufficient molybdenum to give a weld deposit containing for about 4 to 6 weight percent of molybdenum wherein the alloy consists essentially of, in weight percent:

Silicon: from 0.0 to 0.6%,
Manganese: from 0.05 to 2.0%,
Carbon: from 0.01 to 0.1%,
Nickel: from 10 to 15%,
Chromium: from 17 to 23%,
Molybdenum: from 5 to 7.5%, and
the balance iron and incidental impurities and residual elements.

2. The corrosion resistant welding alloy of claim 1 wherein the molybdenum content is about 6.75% weight percent.

3. A corrosion resistant overlay cladding stainless steel weld deposit containing from about 4 to 6 weight percent of molybdenum wherein the deposit consists essentially of, in weight percent, in addition to the molybdenum:

Silicon: from 0.5 to 1.0%,
Manganese: from 1.0 to 2.0%,
Carbon: from 0.01 to 0.1%,
Nickel: from 10 to 15%,
Chromium: from 17 to 23%, and the
balance iron and incidental impurities and residual elements.

4. The corrosion resistant weld deposit of claim 3 wherein the molybdenum content is about 5.5 weight percent.

* * * * *